United States Patent [19]

Birch

[11] Patent Number: 4,941,045
[45] Date of Patent: Jul. 10, 1990

[54] METHOD AND APPARATUS FOR IMPROVING VERTICAL DEFINITION OF A TELEVISION SIGNAL BY SCAN CONVERSION

[75] Inventor: Christopher H. Birch, Toronto, Canada

[73] Assignee: Scientific-Atlanta, Inc., Atlanta, Ga.

[21] Appl. No.: 255,328

[22] Filed: Oct. 11, 1988

[51] Int. Cl.⁵ .................. H04N 7/01; H04N 7/12; H04N 7/18
[52] U.S. Cl. .................. 358/140; 358/135; 358/105; 382/56
[58] Field of Search ............. 358/133, 135, 136, 140, 358/141, 11, 12, 160, 105; 382/58

[56] References Cited

U.S. PATENT DOCUMENTS

| | | | |
|---|---|---|---|
| 4,292,652 | 9/1981 | Yumde et al. | 358/138 |
| 4,300,162 | 11/1981 | Robers | 358/138 |
| 4,323,916 | 4/1982 | Dischert et al. | 358/13 |
| 4,364,090 | 12/1982 | Wendland | 358/140 |
| 4,415,931 | 11/1983 | Dischert | 358/242 |
| 4,530,004 | 7/1985 | Achiha et al. | 358/11 |
| 4,531,151 | 7/1985 | Hentschke | 358/135 |
| 4,551,753 | 11/1985 | Nishizawa et al. | 358/140 |
| 4,558,347 | 12/1985 | Pritchard et al. | 358/11 |
| 4,577,225 | 3/1986 | Pritchard | 358/140 |
| 4,580,163 | 4/1986 | Hartmeier | 358/140 |
| 4,603,350 | 7/1986 | Arbeiter et al. | 358/140 |
| 4,605,962 | 8/1986 | Christopher et al. | 358/140 |
| 4,636,857 | 1/1987 | Achiha et al. | 358/140 |
| 4,639,763 | 1/1987 | Willis et al. | 358/11 |
| 4,661,850 | 4/1987 | Strolle et al. | 358/140 |
| 4,672,424 | 6/1987 | Lechner | 358/11 |
| 4,677,483 | 6/1987 | Dischert et al. | 358/140 |
| 4,698,675 | 10/1987 | Casey | 358/140 |
| 4,713,786 | 12/1987 | Roskind | 364/715 |
| 4,723,163 | 2/1988 | Skinner | 358/140 |
| 4,730,217 | 3/1988 | Tonge et al. | 358/140 |
| 4,731,648 | 3/1988 | Bernard et al. | 358/1.5 |
| 4,733,300 | 3/1988 | Sugiyama et al. | 358/140 |
| 4,740,842 | 4/1988 | Annegarn et al. | 358/140 |
| 4,768,092 | 8/1988 | Ishikawa | 358/140 |
| 4,789,893 | 12/1988 | Weston | 358/140 |

OTHER PUBLICATIONS

"Theoretical and Subjective Comparison of Flicker-Reduction Methods", EBU Review-Technical, No. 222, Apr. 1987, pp. 70–79.

*Primary Examiner*—John K. Peng
*Attorney, Agent, or Firm*—Banner, Birch, McKie & Beckett

[57] ABSTRACT

Scan conversion apparatus for improving the vertical resolution of a television image for display comprises a field store for storing the previously transmitted field and a line store for storing video data representative of the previous line including the most recent picture element. In an interlaced system, the two vertically adjacent picture elements and the intermediate picture element transmitted in the previous field are used to provide five selectable values. The video data is also tested in accordance with three tests comprising a rank ordering test, a vertically sharp transition test and a motion test. According to the results of these tests, one of the five alternative values is chosen as an interpolated value for display with the vertically adjacent values for the currently transmitted field. The selection process may be assisted by the provision of an auxiliary signal indicative of the probability of motion of a predetermined block of data.

17 Claims, 4 Drawing Sheets

METHOD AND APPARATUS FOR IMPROVING VERTICAL DEFINITION OF A TELEVISION SIGNAL BY SCAN CONVERSION

BACKGROUND OF THE INVENTION

1. Technical Field

The invention relates to the field of television signal transmission systems and, in particular, to a method and apparatus for application at the location of a television receiver for improving vertical definition of a television signal by scan conversion.

2. Description of the Relevant Art

There is a growing interest in the transmission of television signals which increase picture definition in both horizontal and vertical dimensions. In the vertical dimension, such a signal may have as many as twice the number of lines in comparison with existing standards. As a result of providing standard resolution, there are adverse effects from providing wide screen displays of a transmitted signal. A viewer of a standard resolution signal may complain of the fuzzy or unclear quality of the displayed image if viewed from a relatively close proximity. The adverse effects are overcome by a higher resolution image but existent transmission systems are not readily adaptable to transmitting a high resolution image.

In sequential scan interlaced systems, a standard resolution 525 line 2:1 interlace NTSC video signal consists of two fields each containing 240 active lines. Lines of every other (odd) field are spacially offset relative to lines of even fields so that all 480 active lines are regularly spaced on the display screen. Neighboring adjacent lines are from alternate (odd or even) fields.

In principle, this line structure can carry a vertical resolution equal to 480 lines for static images. However, a normal interlaced display does not achieve this value. Only 240 lines are displayed in each field and a field is displayed for only 1/60th of a second. The human eye/brain is expected to sum the two fields and perceive all 480 lines which is more easily done for static than dynamic images. The intensity of the first field perceived has decreased to approximately 50% of its initial value by the time the second field arrives 1/60th of a second later. This has two consequences: (i) line structure becomes visible, (ii) vertical frequencies exceeding 240 lines are partially aliased in the display.

The net result is that the perceived vertical resolution of a standard resolution 525 line interlaced display lies somewhere between 240 and 480 lines. The reduction is conventionally described in the art by the "Kell factor" where perceived vertical resolution is equal to 0.66 (the Kell factor)×480=320 Lines.

For static pictures, the Kell factor may be entirely eliminated and resolution restored to 480 lines by displaying all 480 lines (from both odd and even fields) in each 1/60 second field period. The 240 lines from the previous field transmission are stored in a field store and displayed with the current field transmission. This technique is known as scan conversion. The method, however, only perfectly applies for static images and some compromise is necessary for dealing with dynamic images.

Several manufacturers of television receivers or projectors are using proprietary line doubling techniques including Philips, Hitachi, Sony, Ikegami, etc. Scan conversion line doubling applies equally to component signals (luminance, chrominance) or NTSC signals received from any source. The technique may be applied in the television receiver, a cable television decoder/converter, a satellite signal decoder or practically any device located at or near the receiver location. If applied in a television receiver, the field store can be used for other consumer features such as picture-in-picture or noise reduction.

There remains a requirement in the art, however, to optimize the application of scan converters for dynamic images such that the perceived resolution is improved beyond the level of 320 lines whenever possible with a moving image.

SUMMARY OF THE INVENTION

The problems and related problems of prior art scan conversion methods and apparatus are overcome by the principles of the present invention which optimizes the display of an interlaced image by analyzing the dynamic characteristics of the image. One mode of image analysis relates to testing vertically adjacent picture elements or larger sample portions in the same field to determine if the difference in their intensity exceeds a predetermined threshold. If the difference is great, then, this is an indication that there may be an object edge or sharp transition.

Another mode of analysis relates to an amplitude ordering of the two vertically adjacent picture elements in the same field with data for the picture element vertically falling between these picture elements from the previous field. This analysis may be described as a vertical shading analysis.

A third mode of analysis of picture element data relates to averaging the data of the two adjacent picture elements of the current field and comparing this average value with the intermediate pixel data value from the previous field. If the difference between these values exceeds a predetermined threshold, then it is likely that there has been a change of scene or movement of the image or other moving transition.

In accordance with another feature of the present invention, image analysis may be assisted by the generation of an error signal for transmission with the video signal that is indicative of the probability of motion for a block of picture element data. An error signal generator may be located at any point in the video transmission system chain where a progressively scanned signal obtained directly from the video source is available. This data stream may be transmitted, for example, as a 19.2 kilobit or other comparatively low bit rate data transmission signal over a satellite system in a spare audio channel.

Furthermore, if the present invention is to be used in association with a teletext receiver or decoder, the teletext generator may provide an input to the present scan conversion apparatus indicative of a static image or image portion, for example, in the event of captioning for the hearing impaired. Such an input to the decision-making process may preempt the selection of alternatives and force the selection of a vertically intermediate value from the next or previous field.

In regard to determining a picture element value or larger portion of a line for display, a number of alternatives are determined and from these alternatives one selected based on the above analysis. Each of the three pixel values or line portions used in testing comprises one alternative: vertical pixels in the same field and the intermediate vertical pixel from the previous field. Another alternative is calculated from the arithmetic average of the two vertically adjacent pixels from the same field. A fifth alternative includes twice the value of the intermediate pixel in calculating a weighted average value, that is, the arithmetic average value of the adjacent pixels from the same field and the weighted value of the intermediate pixel.

If there is no or little evidence of motion, the intermediate pixel value from the previous field will be displayed. If there is an indication of motion but the difference between the adjacent pixels is small, the average value of the adjacent pixels will be displayed. If there is high evidence of a vertical transition, then either the intermediate pixel value is selected if its value is between the two adjacent pixel values or the weighted average value is used (when the intermediate pixel is not intermediate in value). If there is both a high measurement of transition from the difference between the adjacent pixel values and there is also a high measurement of there having been a moving transition, then the pixel value which is the middle or median value among the two adjacent pixel values and the intermediate pixel value is selected for display.

Apparatus for accomplishing this optimized display comprises a field store, a line store, pixel or line portion value calculating means, pixel analysis circuits, and a selection circuit responsive to the pixel analysis circuit. In particular, the decision, selection, and calculating circuits may be embodied in the form of a programmed microprocessor or logic circuitry or any other convenient form. In another embodiment, digital "median" value filters may be applied for determining a median value among a plurality of values. As suggested earlier, the output of the field store may be used alternatively for other consumer features such as the development of picture-in-picture images. Also, the scan converter may be implemented in a receiver, a cable television converter/decoder, a satellite signal receiver or any other device at or near the location of a receiver. Furthermore, the process may be applied to luminance, chrominance, a composite NTSC signal or PAL signal (with appropriate additional processing to compensate for line to line changes in color subcarrier phase). The signal furthermore need not be interlaced for practicing the analytical principles of the present invention; however, in a non-interlaced environment, while two adjacent values from the preceding field may be used in the decision-making analysis they provide no better information than is existent in the current field for calculating alternative interpolated values for selective display.

The embodiment for interlaced video signal transmission depends on the assumption that the previous field contains a line of data with the correct spatial information (but incorrect temporally) which may offer a better interpolated value than any interpolated value possible from adjacent lines from the current field (which information is correct temporally but incorrect spatially). Progressively scanned (non-interlaced) video signals do not offer the possibility of trading spatial and temporal information. Signal to noise ratio improvement can be achieved in a non-interlaced embodiment by predictive forecasting based on variations in differences in vertically adjacent (same field) and horizontally adjacent (interfield) picture elements or signal portions.

In accordance with a further feature of the present invention, the provision of an additional field store provides the opportunity for improved image analysis and additional alternative interpolated values.

DETAILED DESCRIPTION

In order to increase the quality of a television picture, it is advantageous to double the number of lines prior to display. The number of displayed lines is then twice as great as the number of transmitted lines. For example, in a 525 line 2:1 interlace transmission (262½ lines per picture field), 480 active lines may be displayed simultaneously instead of 240 active lines (progressively scan, 525 lines). This process is known in the art as scan conversion. Under certain and especially static image conditions, scan conversion can not only eliminate the visibility of line structure from the displayed picture, but also increase the vertical resolution.

In order to increase the vertical resolution by scan conversion, it is necessary to make use of lines transmitted in an earlier field which are vertically offset relative to the current field. For example, referring to FIG. 1, picture element or line portion (c) from the previous field may be used to assist in determining the picture elements or line portions (d) by interpolation. In this case, the interpolated element value or line portion (d) can carry more information than is available from the current field and vertical resolution can be increased. In particular, in non-moving or static parts of the picture, element or line portion (c) alone is an ideal interpolator for data of line (d). However, in areas of the picture having motion, the information on line (c) relates to a part of the scene which has been displaced during the 1/60th second field delay, and direct use of the data of line (c) to interpolate data for line (d) may lead to motion artifacts. In moving areas of the picture, it is therefore advantageous to employ only picture element values from lines (a) and (b) of the current field to interpolate data values for line (d) while in static image areas, the picture element value for line (c) is appropriate. The present invention provides an optimum interpolation of the picture element information on line (d) on a sample-by-sample basis using only the values (a), (b) and (c). This leads to a low cost implementation of a scan converter which improves vertical resolution.

Figure 2:
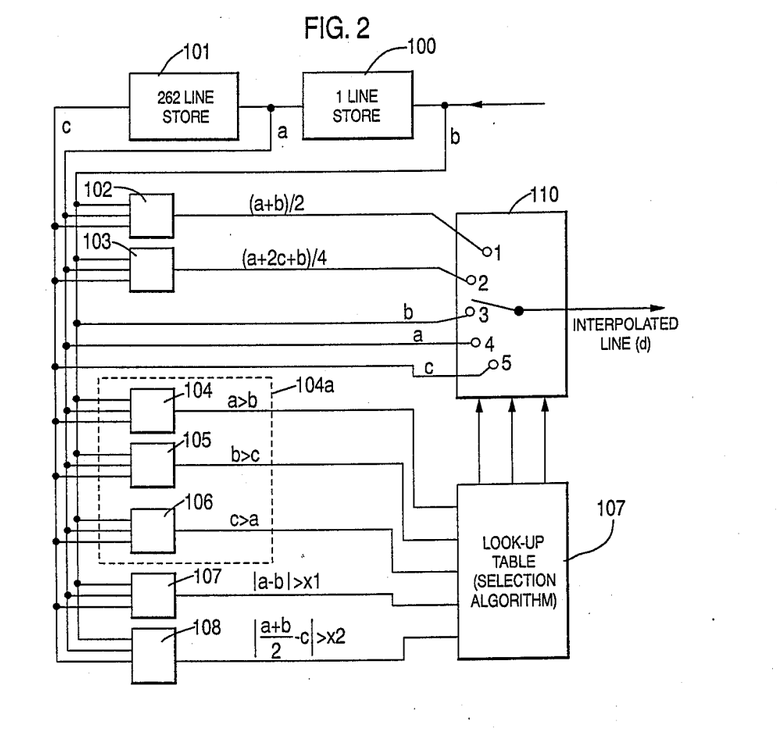
FIG. 2 is a block schematic diagram of scan conversion apparatus for improving vertical resolution in accordance with the present invention.

FIG. 2 shows a block schematic diagram of the interpolator. Five candidate values for the interpolated pixel sample on line (d) are generated simultaneously. These candidate values are based on approximations appropriate to different conditions of picture detail and motion. Selection between the candidates is made by executing three modes of analysis on the sample values a, b, c comprising five tests. A logical combination of the five test results is used in selecting the best candidate interpolated value. The three modes of analysis relate to ranking by amplitude primarily for determining the intermediate or median value, sharp transition analysis where an edge of an object, for example, may be evidenced vertically and motion analysis identifying scene changes or a moving image.

The five alternative values for selection as the value for display on line (d) are calculated according to the following:

(i) $(a+b)/2$: Average value for adjacent vertical pixels of the same field, appropriate in the case of motion when the values of a and b are close together.

(ii) $(a+2c+b)/4$: A weighted average value for this field and the previous field, appropriate in the case where there is weak evidence of motion.

(iii) (b): Appropriate where there is evidence of motion and the value of (b) falls between (c) and (a).

(iv) (a): Appropriate where there is evidence of motion and the value of (a) falls between (c) and (b).

(v) (c): Appropriate where there is no evidence of motion.

The five tests performed relate to rank ordering, tests i–iii below; sharp transition analysis, test (iv) below, and moving transition, test (v) below:

| (i)   | $a > b$              | Yes/No |
|-------|----------------------|--------|
| (ii)  | $b > c$              | Yes/No |
| (iii) | $c > a$              | Yes/No |
| (iv)  | $|a - b| > X_1$      | Yes/No |
| (v)   | $|(a + b)/2 - c| > X_2$ | Yes/No |

The first three tests (i)–(iii) identify the sequence of the samples. Tests (iv) and (v) together gather evidence concerning motion. If $|a-b|$ is small and $|(a+b)/2-c|$ is large, there is good evidence of motion in the picture.

Selection of the most appropriate interpolation is based on these five tests.

1. $|a-b|$ Small, $|(a+b)/2-c|$ Small
   All three values similar. No evidence of motion. Select c.
2. $|a-b|$ Small, $|(a+b)/2-c|$ Large
   Good evidence of motion. Select $(a+b)/2$.
3. $|a-b|$ Large, $|(a+b)/2-c|$ Small
   Evidence of a vertical edge transition.
   If c is between a and b, select c, otherwise, select $(a+2c+b)/4$.
4. $|a-b|$ Large, $|(a+b)/2-c|$ Large
   Evidence of a sharp transition or a moving transition. Select the middle value of a, b, c.

Referring now to FIG. 2, exemplary apparatus for accomplishing the above-described scan conversion method is shown. According to FIG. 2, a line store 100 stores picture element or line portion data for the current received line. Samples a and b are separated by one line and so represent vertically adjacent picture elements or larger signal portions. Field store 101 stores the previous field comprising 262 or 263 lines of data. The length of this delay is changed on alternate fields to ensure that element data c is output from field store 101 to be spatially intermediate between adjacent elements a and b of the current field. Element data value c is output from the field store delayed by one field so that it is the intermediate or vertically offset picture element or line portion between elements or portions a and b from the previous field.

Sample combiner circuit 102 may be any arithmetic logic circuit known in the art for accomplishing the arithmetic function indicated or comprise, in combination with all of circuits 102–110, a data processor for determining all arithmetic and decision operations including the arithmetic average of vertically adjacent samples a and b. Circuit 103 provides a weighted average value including twice the value of intermediate sample c from the previous field.

Comparator or decision circuits 104–106 test for the relative amplitudes of samples a, b and c so they may be ranked and the median value determined. Digital filter 104a for determining the median value may be substituted for comparator or decision circuits 104–106. Their outputs are provided to decision circuit 109 simultaneous with the results of two other tests performed by decision circuits 107 and 108.

Decision circuit 107 relates the difference between the two vertically adjacent picture element samples to a predetermined threshold to determine if the difference is large or small. If large, the difference value demonstrates a sharp vertical transition.

Decision circuit 108 relates to comparing the average value from the current field to the intermediate value from the previous field. If large, the difference value between the two fields represents a change in scene or a motion transition. If a whole line of samples changes between fields, it is likely there is a change in entire scene and not mere motion of an object within a scene.

According to data processor 109, a selection is made based on the tests described above and, in particular, on what conclusions may be made in accordance with the tests. Consequently, selection circuit 110 for selection of a particular input for display may preferably operate in real time with incoming television signal reception.

Alternatively to comparator or decision circuits 103–105 and selection circuit 110, digital median value filters or selection circuits are known, for example, from U.S. Pat. No. 4,713,785 to Roskind incorporated herein by reference or from C. Hentschel, "The Theoretical and Subjective Comparison of Flicker—Reduction Methods" appearing at pages 70–79 in the April, 1987 issue of the *E.B.U. Technical Review*.

At the output of selection circuit 110 is an interpolated video signal data stream for eventual display as a line portion which at any one point in time may be any one of five alternative data values. Three outputs are shown from decision circuit 109 to represent one of eight parallel data selection where only one of five alternatives are in fact selected in the depicted embodiment.

Figure 3:
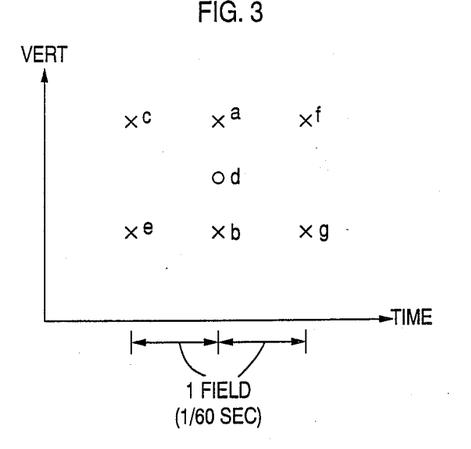
FIG. 3 represents an exaggerated graph of vertical resolution over time in a non-interlaced environment wherein no spatially or temporally correct data is available in a previous field for interpolating an intermediate line.

The above-described scan conversion apparatus and method primarily relates to an interlaced signal transmission. In a non-interlaced video signal transmission system according to FIG. 3, samples a and b from the current field would be compared to samples c and e on the same line from the previous field. The result of the comparison would not be so successful for the interpolation of a value d for a line d intermediate a and b as none of the samples a, b, c, e provide spatially accurate data as to the actual value of d. However, by means of predictive forecasting algorithms regarding the variations between a and c, b and e, and a and b a better approximation of interpolated value d may result than a simple average value of a and b. Also, signal to noise ratio at a receiver may be improved by using the value of a and c as a predictor of next field value f or e and b as a predictor of next field value g.

Figure 4:
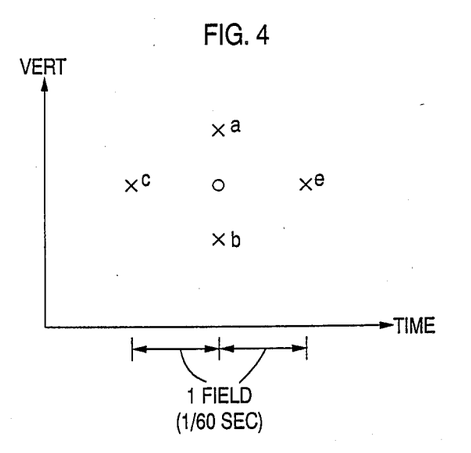
FIG. 4 represents an exaggerated graph of vertical resolution over time in an interlaced environment as in FIG. 1 but where data for the next field as well as the preceding field are available for interpolating an intermediate line of the current field.

Referring now to FIG. 4, there is shown another graph of vertical resolution versus time but in which it is assumed that another spatially correct value e from the next field is available for interpolation of data for line d in the current field besides value c from the previous field.

Figure 1:
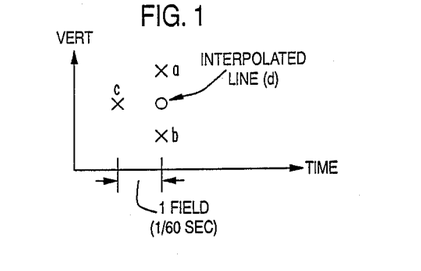
FIG. 1 represents an exaggerated graph of vertical resolution over time in which picture element or signal portion values for two adjacent vertical picture elements or signal portions (a) and (b) of the same field are shown along with intermediate element (c) from the preceding field to show that an interpolated value (d) is the object of the present invention for display in the current field. A picture element is assumed to be the smallest horizontally resolvable element of a line while the signal portion may comprise a whole line.
Figure 5:
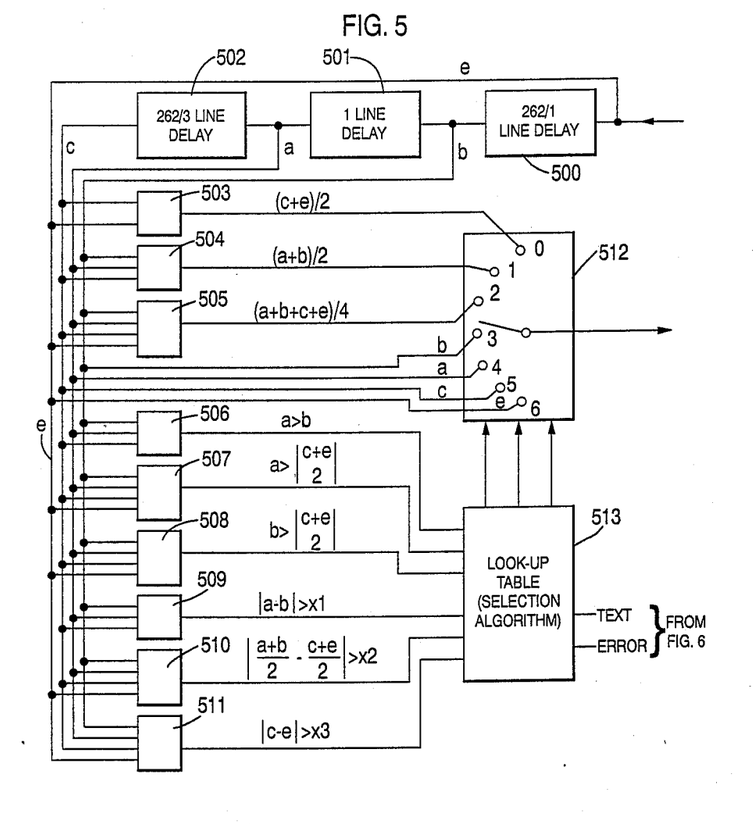
FIG. 5 is a block schematic diagram of scan conversion apparatus for improving vertical resolution comprising two field stores.

Referring to FIG. 5, an additional field store or delay 500 is shown to field store 502 in comparison with the embodiment of FIG. 1. Field store 500 provides sample e of FIG. 4.

The input to the one line store 501 for providing sample b is preceded by field store 500 (a 262/261 line store). Additional sample e is temporally offset but spatially on the interpolated line d such as is sample e. The delay of field store 500 plus the delay of line store 501 is equal to the delay of field store 502. Consequently, sample e represents information which is spatially correct, but temporally belongs to the next field; (sample c belongs to the previous field). Thus, extra interpolated values may be generated for input to the selector 512, typically:

| | |
|---|---|
| (e) | selector position 6 |
| (c + e)/2 | selector position 0 |
| (a + b + c + e)/4 | now selector position 2 |

Value e is equivalent to c in the implementation described in connection with the embodiment of FIG. 1 but is a better value in the event of a scene change between the previous field and the current field. Similarly, value c is a better value in the event of a scene change between the current field and the next field. The value $(c+e)/2$ may be used as an alternate to c or e alone with some advantage of noise reduction and natural temporal smoothing. Similarly $(a+b+c+e)/4$ may be a superior interpolated value over the $(a+2c+b)/4$ value mentioned previously.

Additional decision criteria may also be derived from the sample e:

$$c - e > X3$$

being perhaps the most useful in identifying motion as distinct from a static vertical impulse.

Other useful decision-making criteria which may be developed from sample e include:

$$a > e$$
$$b > e$$
$$|(a + b)/2 - e| > X2$$
$$a > (c + e)/2$$
$$b > (c + e)/2$$

$$|(a + b)/2 - (c + e)/2| > X2$$

It is unlikely that the selection algorithm will need input from all these tests in addition to the tests shown in FIG. 2 to operate satisfactorily. The favored six tests according to logic circuits 506–511 for a two field store embodiment are:

(i) $a > b$
(ii) $a > (c+e)/2$
(iii) $b > (c+e)/2$
(iv) $|a-b| > X1$
(v) $|(a+b)/2 - (c+e)/2| > X2$
(vi) $|(c-e)| > X3$ where X1, X2, and X3 are predetermined test limits.

In the rank ordering test i to iii, the relative magnitude of a and b with the average value of samples c and e is determined.

Figure 6:
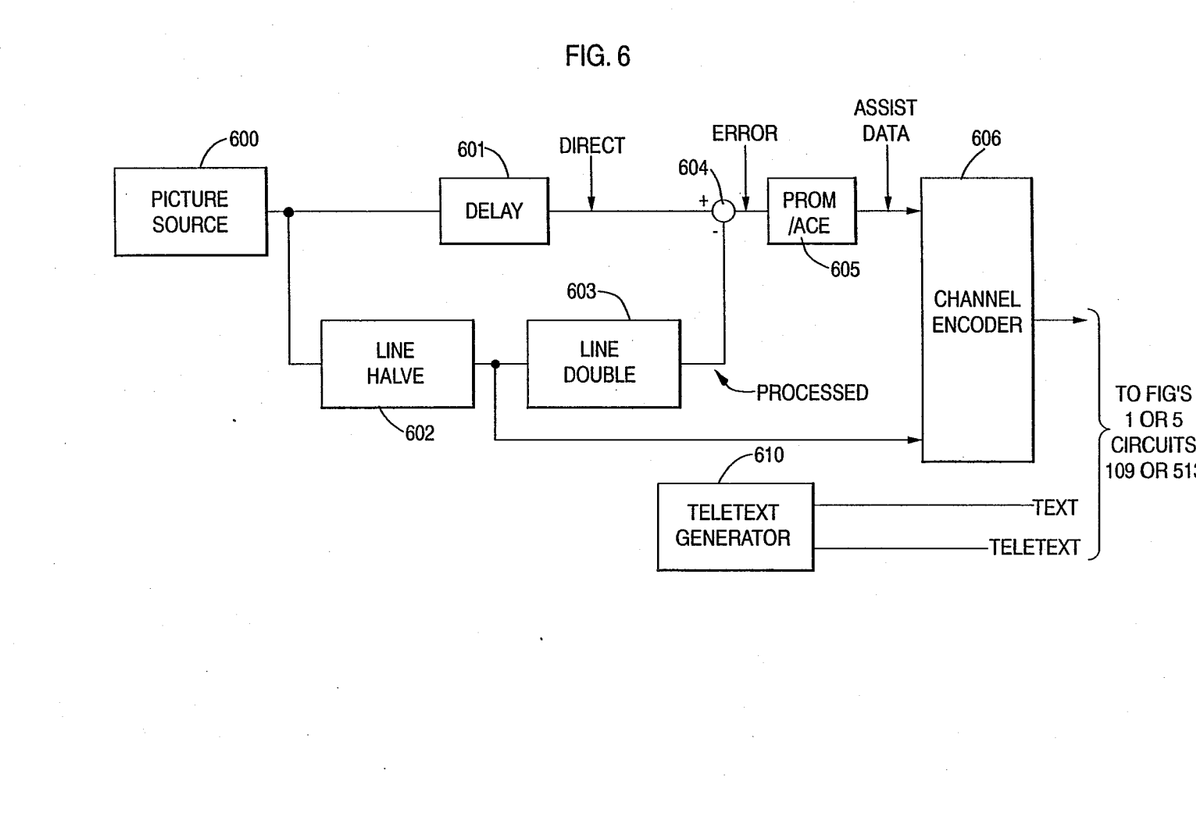
FIG. 6 is a block schematic diagram of apparatus for providing either a preemptive or an error data signal related to a block of picture elements predictive of image motion for assisting in the decision-making process accomplished by circuit 109 of FIG. 1 or circuit 513 of FIG. 5.

Referring now to FIG. 6, apparatus is shown for providing an auxiliary input signal to either decision-making circuit 109 of FIG. 1 or circuit 513 of FIG. 5. At a point in the video transmission chain between the picture source 600, for example, at a television studio, and a signal encoder 606 for formatting and multiplexing or encoding a signal for transmission toward a receiver, an error signal generator 601–605 is provided for generating an error signal ERROR from an actual and simulated progressively scanned high resolution video signal. Line halver circuit 602 halves the output of picture source 600 while a line doubler 603 according to the present invention (FIG. 1 or 5) simulates the output of the present scan conversion. Delay 601 compensates for delay in circuits 602 and 603. At combiner 604 an ERROR signal is generated related to the difference between the source image and the simulated (processed) image output of doubler 603. According to a look-up table 605 a one or two bit assist data stream is generated for a block of video signal for transmission. Desirably such an error signal ERROR is a data signal indicative of the probability of motion in a predetermined block of video data.

The predetermined block of video data is preferably horizontally wider than vertically long, for example, sixteen pixels wide by eight lines vertically. The reason for this is to use data which reflects changes in vertical direction with greater precision than changes in horizontal direction.

The output ASSIST DATA of error signal generator 601–605 may, for example, be a single bit indicator of whether there is more likely a dynamic or a static image within this block. If the output comprises two bit messages, the signal may provide a coded signal in which one value may identify a clearly static image and the other three values an indication of the probability of motion.

Signal encoder 606 may comprise, for example, an auxiliary data transmission on a separate data channel (in band or out-of-band) of a cable television system or a B-type multiplexed analog components satellite signal encoder. In the latter case, a 19.2 kilobit assist data signal may be alternatively transmitted on one of four or six audio channels. Upon receipt by circuits 109 or 513 the error signal data stream may assist or may even preempt analysis of the received video signal.

Furthermore, signal encoder 606 may be designed in accordance with copending application Ser. No. 255,317, filed concurrently herewith entitled "High Definition B-MAC Television Signal Transmission System" of Keith Lucas incorporated herein by reference. In accordance with that application, signal encoder 602 provides a horizontal resolution improvement of the video signal while the present invention improves vertical resolution. Consequently, the inventions compliment one another when applied in a direct broadcast satellite system.

At or near the location of the receiver or in connection with transmission of a teletext signal for display with a transmitted dynamic video signal, teletext generator 610 may provide a preemptive signal TEXT which may correspond to a teletext character or a predetermined block of characters or portion of an image or a frame for display. The frame, frame portion or character is displayed for the period of time or duration of output signal teletext and so a static image provided for such image portion. In this manner, the signal TEXT forces data for line c or e to be displayed and so preempts any other selectable alternative. Alternatively, if the image portion is a predetermined size such as the size of a teletext character, the signal teletext without an auxiliary signal TEXT will preempt a choice of value c or e for element d.

I claim:

1. A scan conversion method at or near the location of a television signal receiver for improving vertical resolution by interpolation in the event of a moving image comprising the steps of:
   (i) storing data values for adjacent picture elements separated by one vertical line from picture elements of a current field,
   (ii) storing at least a data value for one picture element for the previous field proximate in vertical location to the adjacent picture elements of step (i),
   (iii) rank ordering in amplitude level the data values stored in steps (i) and (ii),
   (iv) determining whether the difference of the data values for adjacent picture elements of step (i) exceeds a first predetermined value,
   (v) determining the event of a moving image by calculating whether the difference in data values between fields exceeds a second predetermined value,
   (vi) mathematically calculating an average value from at least two of the picture element data values of steps (i) or (ii), and
   (vii) selecting one of the data values of steps (i) or (ii) or the average value calculated in step (vi) as an interpolated value for display.

2. A scan conversion method according to claim 1 additionally comprising the steps of
   (viii) storing at least a data value for one picture element for the next field proximate in vertical location to the adjacent picture element data values of step (i) and
   in step (iii) rank ordering the data values of step (i) with the average value of the data values of steps (ii) and (viii) in stead of the data values of step (ii).

3. A scan conversion method according to claim 1 additionally comprising the step of
   (viii) providing an error signal indicative of the probability of motion occurring in a predetermined block of video signal data for assistance in the determination step (v).

4. At or near a television receiver, a scan conversion method for increasing the vertical resolution of a television image to be displayed comprising the steps of storing predetermined portions of a received television signal comprising a portion of the signal one field and one line removed from the received signal, ordering by magnitude the portion of the received television signal one field removed, the portion one line removed and a portion of the signal currently being received, testing the received signal portions for sharp vertical transitions, testing the received signal portions for object motion, calculating an average value of the portions of the received signal one line removed from one another, calculating a weighted average value of the portions of the received signal one line and one field removed from one another, and selecting, responsive to the ordering and testing, a portion of the received signal or the calculated average value of portions of the received signal or the weighted average value for display.

5. A scan converter for increasing the vertical resolution of a television image for display comprising
   means for storing predetermined portions of a received television signal comprising a portion of the signal one field and one line removed from the received signal,
   means for ordering by magnitude at least the portion of the received television signal one field removed, the portion one line removed and a portion of the signal currently being received,
   means for calculating at least one average magnitude value of portions of the received television signal one line removed from one another,
   testing means for testing the received signal portions for vertical transitions, shading, and object motion and
   selection means responsive to the received signal testing means for selecting a portion of the received signal or the at least one calculated average magnitude value of portions of the received signal for display.

6. A scan converter according to claim 5 wherein the magnitude ordering means comprises a digital filter for determining the median value of a plurality of predetermined portions of the received signal one line and one field removed from one another.

7. An error signal generator for providing an error signal input to the testing means of the scan converter of claim 5,
   the error signal generator responsive to a high resolution signal output of a picture source for providing an error signal indicative of the probability of motion of a block of video signal having predetermined dimensions.

8. An error signal generator according to claim 7 comprising
   a teletext generator for providing simultaneous teletext and error signal outputs, the error signal preempting the selected output of the selection means for a teletext character, a predetermined block of characters or for an entire frame.

9. An error signal generator according to claim 7, the predetermined dimensions of the block of video signal comprising a width in picture elements greater than its length in lines.

10. An error signal generator according to claim 9 comprising a teletext generator for providing a teletext signal output representing characters, the teletext signal preempting the selected output of the selection means for interpolating values of picture elements of the teletext characters.

11. A scan converter according to claim 5 wherein the signal storage means comprises a line store and a field store.

12. A scan converter according to claim 11 wherein the signal storage means comprises first and second field stores, the first field store for storing data one field previous to the current field and the second field store for storing data one field in advance of the current field.

13. A scan converter according to claim 12, the calculated average value of portions of the received signal for display comprising an average value of picture elements two fields removed from one another, an average value of vertically adjacent picture elements of the current field and an average value of the picture elements two fields removed from one another and the vertically adjacent picture elements of the current field.

14. A television system including a scan converter for increasing the vertical resolution of a television image for display and an error signal generator, the scan converter comprising
   means for storing predetermined portions of a received television signal comprising a portion of the signal one field and one line removed from the received signal,
   means for ordering by magnitude the portion of the received television signal one field removed, the portion one line removed and a portion of the signal currently being received,
   testing means for testing the received signal portions for vertical transitions, shading, and object motion and
   selection means responsive to the received signal testing means for selecting a portion of the received signal or a calculated average value of portions of the received signal for display, and
   the error signal generator for providing an error signal input to the testing means of the scan converter, the error signal generator responsive to a high resolution signal output of a picture source for providing an error signal indicative of the probability of motion of a block of video signal having predetermined dimensions.

15. A scan conversion method for improving vertical resolution of a television signal by interpolation comprising the steps of:
   (i) storing data values for adjacent picture elements separated by one vertical line of a current field,
   (ii) storing at least data values for picture elements for the previous field and for picture elements of the next field proximate in vertical location to the vertically adjacent picture elements of step (i),
   (iii) rank ordering in amplitude level the data values of steps (i) and (ii),
   (iv) determining whether the difference of the data values for vertically adjacent picture elements of step (i) exceeds a first predetermined value,
   (v) determining whether the difference in stored data values between at least two fields exceeds a second predetermined value, and
   (vi) selecting one of the data values of steps (i) or (ii) or of arithmetic combinations of the data values of steps (i) or (ii) as an interpolated value for display.

16. A scan converter for increasing the vertical resolution of a television signal for display comprising
   a line store for providing portions of a received signal one line removed from one another,
   a first and second field store coupled to an input and an output of the line store respectively for providing portions of the received signal one field removed from the signal stored in the line store,
   means for ordering by magnitude the portions of the signal one line and one field removed from one another,
   testing means for testing the received signal portions for vertical transitions, shading, and object motion and
   selection means responsive to the received signal testing means for selecting a portion of the received signal or a calculated average value of portions of the received signal for display.

17. A scan converter for increasing the vertical definition of a television image for display comprising
   storage means for storing predetermined portions of a received television signal comprising a portion of the signal one field and one line removed from the received signal,
   ordering means for ordering by magnitude at least the portion of the received television signal one field removed, the portion one line removed and a portion of the signal currently being received,
   calculating means for calculating at least one average magnitude value of portions of the received television signal one line and one field removed from one another,
   testing means for testing the received signal portions for vertical transitions, shading and object motion and
   selection means responsive to the received signal testing means for selecting a portion of the received signal or the at least one calculated average magnitude value of portions of the received signal for display.

* * * * *